Van Velthoven & Hazzard.
Photographic Album.
No. 2617. Reissued May 21. 1867.
Fig. 6.
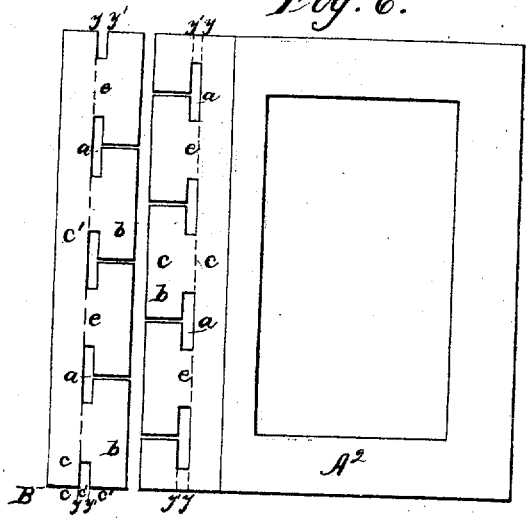
Fig. 1.
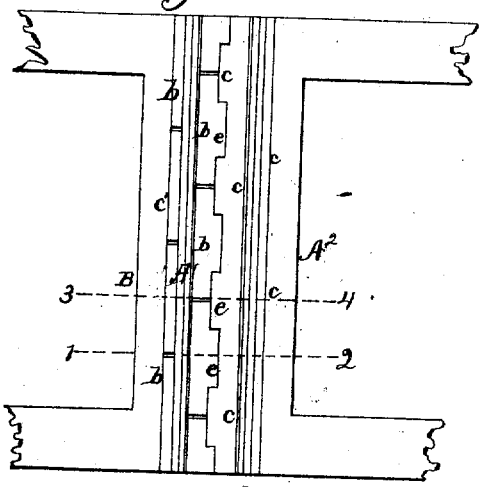
Fig. 2.
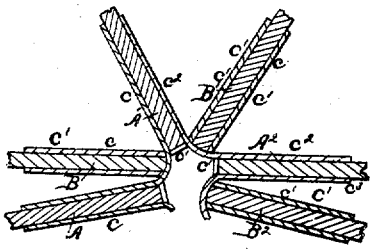
Fig. 3.
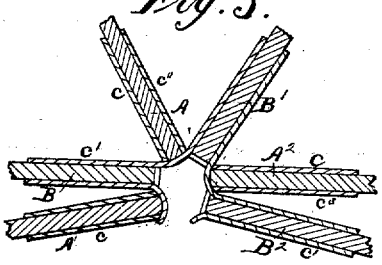
Fig. 4.
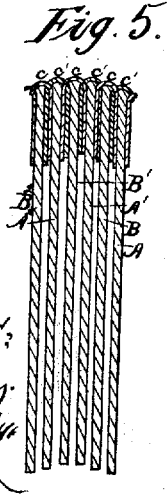
Fig. 8.
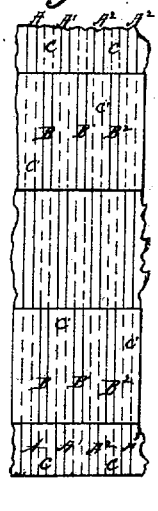
Fig. 7.
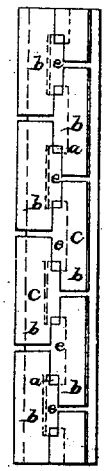
Fig. 5.
Witnesses:
Geo. E. Buckley.
Jay F. Hoadley.
Inventor:
Wm. W. Harding.

United States Patent Office.

WILLIAM W. HARDING, OF PHILADELPHIA, PENNSYLVANIA, ASSIGNEE BY MESNE ASSIGNMENTS OF RICHARD VAN VELTHOVEN AND JOSEPH H. HAZZARD.

*Letters Patent No.* 50,521, *dated October* 17, 1865; *reissue No.* 2,617, *dated May* 21, 1867.

IMPROVEMENT IN PHOTOGRAPHIC ALBUMS.

The Schedule referred to in these Letters Patent and making part of the same.

TO ALL WHOM IT MAY CONCERN:

Be it known that R. VAN VELTHOVEN and J. H. HAZZARD, of Philadelphia, Pennsylvania, did invent an Improvement in Photographic Albums and other books; and that the following is a full, clear, and exact description of the same, reference being had to the annexed drawings, and to the letters of reference marked thereon.

The invention consists in certain flexible strips formed and combined with the leaves of an album or other book, substantially as described hereafter, so that the said leaves shall be firmly bound together.

In order to enable others skilled in the art to apply this invention, the following is a description of the manner of carrying it into effect. On reference to the accompanying drawing, which forms part of this specification—

Figure 1 represents a number of leaves of a photographic album secured together according to our improvement.

Figure 2, a section on the line 1–2, fig. 1.

Figure 3, a section on the line 3–4, fig. 1.

Figure 4, a view looking at the back of the book.

Figure 5, an edge view of part of the book.

Figure 6, a view representing two of the leaves disconnected from each other.

Figure 7, a view showing the manner in which the strips for securing the leaves together are combined; and Figure 8, one of the strips.

Similar letters refer to similar parts throughout the several views.

A $A^1$ $A^2$, B $B^1$ $B^2$ are leaves of a photographic album, and to the inner edges of each of the leaves A, $A^1$, and $A^2$ on one side of the same is pasted or otherwise secured a strip, C, of parchment or other material, a portion of this strip projecting beyond the edge of the leaf, passing across the inner edge of the adjacent leaf B, $B^1$, or $B^2$, and being pasted to the opposite side of the next leaf A, $A^1$, or $A^2$, as best shown in fig. 2. Each strip C may be divided into three parts, *c*, $c^1$, and $c^2$. The portion *c* from one edge to the line *y*, fig. 8, is secured to the edge of one leaf A, the portion $c^1$ between the line $y'$ and the opposite edge of the strip is secured to the edge of another leaf, and the central portion $c''$ between the lines $y\,y'$ passes across the edge of the intermediate leaf, as above described. In the centre of the strip C, between the lines $y\,y'$, is a number of slots, *a a*, and the portion $c^1$ of the strip is cut along the lines *a* so as to form a number of T-shaped tongues or projections, *b*, which are connected with the plain portion *c* of the strip only by the necks *e*, which are equal in length to the slots or openings *a*. The leaves B $B^1$ $B^2$ are connected together in a similar manner by somewhat similar strips, $C^1$, the form of which is best shown in fig. 6. It will be seen, however, that while the tongues *b* at each end of the strip C are incomplete, being in fact of an L-shape, as shown in figs. 6 and 8, the tongues *b* in the strips $C^1$ are all perfect, the two strips being so formed that when placed side by side, as shown in fig. 6, the necks *e* of the tongues in one strip will be opposite the slots *a* in the other strip. When a number of leaves are to be bound together, the leaves A, $A^1$, and $A^2$ are connected to each other in the manner described and as shown in fig. 2. The portion *c* of one of the strips $C^1$ is then secured to one edge of the leaf B, fig. 2, and the latter is introduced between the leaves A and $A^1$, the tongues *b* of the strips $C^1$ being so folded up that each may pass readily through one of the openings *a* in the strip C secured to the leaves $A^1$ and $A^2$. The ends of the tongue *b*, which project beyond the strip $C^2$, and which form the portion $c'$ of the strip *c* $C^1$, are then unfolded and pasted to the side of a leaf, $B^1$, which is introduced between the leaves $A^1$ and $A^2$. To the opposite side of the leaf $B^1$ is secured another strip, $c^1$, and the tongues *b* projecting from the edge of the strip are then passed through the openings *a* in the strips C, marked $C^2$ and $C^3$, secured to the leaves $A^1$ and $A^2$, and the portions of these tongues projecting through the strip $C^2$ are secured to the side of the next leaf $B^2$, additional leaves being secured in a similar manner to those thus bound together, until a book of the size required is made.

By these means the leaves are bound so firmly together that the edges of the same always coincide, the leaves being prevented from sliding across each other, as is the case when heavy boards or leaves are bound together in the usual manner.

While the leaves are thus firmly bound together they will open readily, and when opened will lie perfectly flat without that tendency of the central leaves to assume an upright position which is so usual and objectionable in books bound in the ordinary manner.

Although binding the leaves of photographic albums in this manner has only been referred to, yet it will be apparent that this invention may be used in securing together the heavy boards of which books are formed for exhibiting patterns of fabrics, and for other similar purposes.

Without being confined to the precise form herein described of the strips C $C^1$, or to any particular manner of attaching them to the leaves, or to any particular material for making the same, what is claimed and desired to secure by Letters Patent, is—

The binding of the sheets or cards of albums together by means of strips of leather or muslin, or their equivalents, pasted or otherwise secured to the edges of contiguous or alternate sheets successively through the book.

WM. W. HARDING.

Witnesses:

JOHN WHITE,

GEO. E. BUCKLEY.